(12) United States Patent
Maeda

(10) Patent No.: US 8,964,131 B2
(45) Date of Patent: Feb. 24, 2015

(54) ILLUMINATION DEVICE, DISPLAY DEVICE AND TELEVISION RECEIVING DEVICE

(75) Inventor: Yasutoshi Maeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/342,506

(22) PCT Filed: Aug. 29, 2012

(86) PCT No.: PCT/JP2012/071827
§ 371 (c)(1),
(2), (4) Date: Mar. 3, 2014

(87) PCT Pub. No.: WO2013/035601
PCT Pub. Date: Mar. 14, 2013

(65) Prior Publication Data
US 2014/0204281 A1    Jul. 24, 2014

(30) Foreign Application Priority Data

Sep. 5, 2011    (JP) .................................. 2011-192464

(51) Int. Cl.
| | | |
|---|---|---|
| H04N 5/64 | (2006.01) | |
| G02F 1/1333 | (2006.01) | |
| G02F 1/1335 | (2006.01) | |
| H04N 5/645 | (2006.01) | |

(52) U.S. Cl.
CPC .... *G02F 1/133308* (2013.01); *G02F 1/133611* (2013.01); *H04N 5/645* (2013.01); *G02F 1/133603* (2013.01); *G02F 2203/01* (2013.01); *H04N 5/64* (2013.01); *G02F 2001/133317* (2013.01)
USPC .......................................... 348/794; 348/790

(58) Field of Classification Search
USPC ............ 348/739, 790, 794, 801, 836; 349/58, 349/61, 62, 64
IPC ......................................................... H04N 5/64
See application file for complete search history.

(56) References Cited

U.S. PATENT DOCUMENTS

| | | | | |
|---|---|---|---|---|
| 5,729,310 | A | * | 3/1998 | Horiuchi et al. ................. 349/62 |
| 6,762,806 | B1 | * | 7/2004 | Matsuo et al. ................... 349/58 |
| 8,325,291 | B2 | * | 12/2012 | Oh et al. .......................... 349/58 |
| 8,517,554 | B2 | * | 8/2013 | Okitsu .......................... 362/97.1 |
| 2010/0302717 | A1 | | 12/2010 | Oh et al. |
| 2011/0249453 | A1 | | 10/2011 | Okitsu |

FOREIGN PATENT DOCUMENTS

| | | |
|---|---|---|
| JP | 2010-21040 A | 1/2010 |
| JP | 2010-170138 A | 8/2010 |
| WO | 2010/073804 A1 | 7/2010 |

* cited by examiner

*Primary Examiner* — Trang U Tran
(74) *Attorney, Agent, or Firm* — Chen Yoshimura LLP

(57) ABSTRACT

A display device (10) according to the present invention includes: a liquid crystal panel (11) having a display area (S1) and a frame shaped non-display area (S2) surrounding the periphery of the display area (S1); a transmissive frame section (61) that is provided on the edge part on the side of the rear surface (11b) of the liquid crystal panel (11), and that is formed into frame shape through which light can pass; and light sources (17) that are disposed inside the transmissive frame section (61), and that radiate light onto the rear surface of the liquid crystal panel (11). As a result, even if the width of the non-display area (S2) is set to be narrow, display anomalies can be prevented from occurring in the periphery of the display area (S1).

9 Claims, 10 Drawing Sheets

ILLUMINATION DEVICE, DISPLAY DEVICE AND TELEVISION RECEIVING DEVICE

TECHNICAL FIELD

The present invention relates to an illumination device, a display device, and a television receiver.

BACKGROUND ART

In recent years, liquid crystal panels are in general use in display devices for televisions, mobile telephones, personal digital assistants, and the like. Liquid crystal panels cannot emit light on their own, and thus, in order to display images, light from an illumination device (the so-called backlight device) is used. This illumination device is disposed on the rear surface side of the liquid crystal panel, and is configured so as to radiate light spread in a planar manner towards the rear surface of the liquid crystal panel.

An example of such a display device is disclosed in Patent Document 1. This display device includes a so-called direct-lit illumination device in which light sources such as LEDs are disposed to the rear of a liquid crystal panel. The light sources are attached to the bottom surface of a box-shaped case (chassis) that is open at the top. The liquid crystal panel is fixed to the case such that the peripheral edges of the liquid crystal panel are on frame-shaped side walls of the case.

The peripheral edges of the liquid crystal panel on the side walls of the case are in a non-display region where images are not displayed. This non-display region is provided in the periphery of a display region where images are displayed.

In recent years, the width of the non-display region (frame region) has been narrowed for various aims such as expansion of the display region of liquid crystal panels and design improvements therefor.

RELATED ART DOCUMENT

Patent Document

Patent Document 1: Japanese Patent Application Laid-Open Publication No. 2010-21040

Problems to be Solved by the Invention

As the width of the non-display region becomes narrow, inner frame portions of a frame-shaped member (the side walls and the like of the case described above) for placing the edges of the liquid crystal panel thereon become closer to the display region of the liquid crystal panel. This results in the problem that light from the light sources is blocked at the inner frame portions of the frame member, which causes display anomalies (missing pixels) in the frame portion of the display region.

SUMMARY OF THE INVENTION

An object of the present invention is to provide a display device that includes a support structure for a liquid crystal panel that does not result in display anomalies in the frame portion of the display region even if the non-display region is narrow.

Means for Solving the Problems

The display device according to the present invention includes: a liquid crystal panel having a display region and a frame-shaped non-display region surrounding a periphery of the display region; a frame including a transmissive frame portion over which edges of a rear surface of the liquid crystal panel are disposed, and that allows light to pass therethrough; and light sources that are disposed in an inner side of the transmissive frame portion, and that emit light towards the rear surface of the liquid crystal panel.

In the display device, the edges of the liquid crystal panel are over the frame-shaped transmissive frame portion that allows light to pass therethrough. The light from the light sources passes through the transmissive frame portion, allowing light to reach the edges of the liquid crystal panel on the transmissive frame portion.

In the display device, the transmissive frame portion may be disposed such that an outer edge thereof is in a position corresponding to the non-display region, and so as to be provided at an edge of the rear surface of the liquid crystal panel. If the outer edge of the transmissive frame portion is disposed further out than the boundary between the display region and the non-display region in this manner, the light passing through the transmissive frame portion reliably reaches the periphery of the display region.

In the display device, the frame may further include a frame-shaped non-transmissive frame portion that extends along the transmissive frame portion integrally therewith, and that does not allow light to pass therethrough.

In the display device, the non-transmissive frame portion may be provided so as to surround outer edges of the transmissive frame portion, in a position corresponding to the non-display region. The non-transmissive frame portion is provided in a position corresponding to the non-display region, and thus, light passing through the transmissive frame portion is prevented from passing through the outside of the non-display region.

In the display device, a portion of the non-transmissive frame portion in contact with the transmissive frame portion may be a light-reflecting surface. If the contact portion between the non-transmissive frame portion and the transmissive frame portion is a light-reflecting surface, than the light entering the transmissive frame portion travels towards the periphery of the display region of the liquid crystal panel with greater ease.

In the display device, the light-reflecting surface may be inclined so as to rise from an inner edge towards an outer edge of the transmissive frame portion. If the light-reflecting surface is inclined in this manner, light entering the transmissive frame portion travels towards the periphery of the display region of the liquid crystal panel with even greater ease.

The display device may further include plate-shaped optical members that are disposed between the liquid crystal panel and the light sources, and that allows light radiated from the light sources to pass therethrough, wherein the non-transmissive frame portion has a mounting portion upon which a periphery of the optical members is mounted.

In the display device, the transmissive frame portion may sandwich the periphery of the optical members with the mounting portion.

In the display device, the transmissive frame portion may be provided on edges of the rear surface of the liquid crystal panel such that an inner edge of the transmissive frame portion is in a position corresponding to the display region. If the inner edge of the transmissive frame portion is provided at the edges of the rear surface of the liquid crystal panel in a position corresponding to the display region, then even if the shape (size) of the transmissive frame portion changes due to variations in dimensions or thermal expansion, the liquid crystal panel is provided on the transmissive frame portion without falling through. The transmissive frame portion allows light to pass therethrough, and thus, the inner edge of the transmissive frame portion does not block light entering the display region.

In the display device, the transmissive frame portion may be provided on edges of the rear surface of the liquid crystal panel such that an inner edge of the transmissive frame portion is in a position corresponding to the non-display region.

The display device may include a frame-shaped bezel that covers a periphery of the liquid crystal panel so as to cover the non-display region of the liquid crystal panel from a front surface thereof.

A television receiver according to the present invention includes the display device.

Effects of the Invention

According to the present invention it is possible to provide a display device that includes a support structure for a liquid crystal panel that does not result in display anomalies in the periphery of the display region even if the non-display region is narrow.

DETAILED DESCRIPTION OF EMBODIMENTS

Embodiment 1

Embodiment 1 of the present invention will be explained below with reference to FIGS. 1 to 3. In the present embodiment, a television receiver TV and a liquid crystal display device 10 will be described as examples. The respective drawings have an X axis, a Y axis, and a Z axis, and the drawings are depicted such that the directions of the axes in the respective drawings match. The upper side in FIG. 2 indicates the front (front surface) side, and the lower side in the same drawing indicates the rear (rear surface) side.

Figure 1:
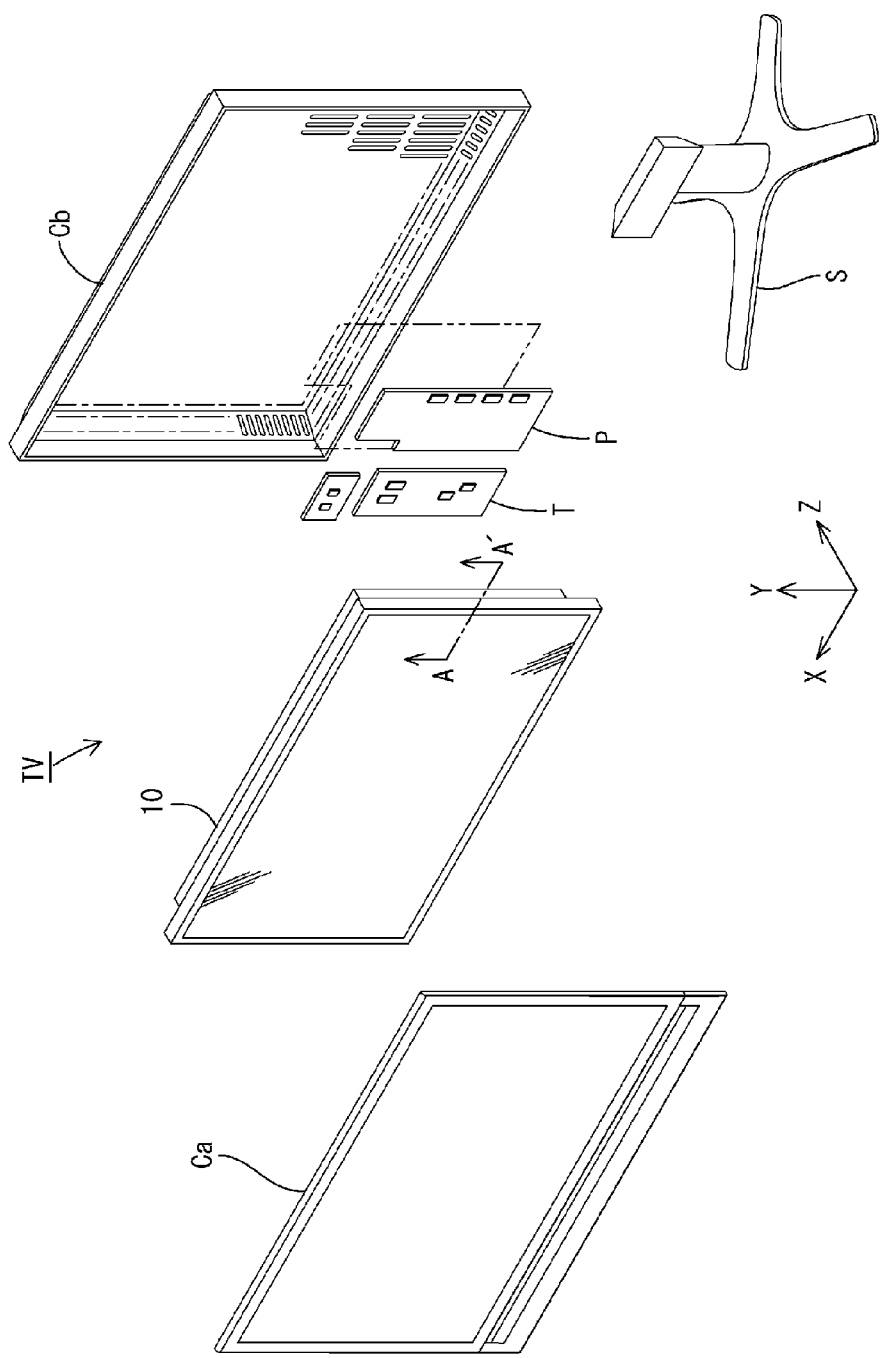
FIG. 1 is an exploded perspective view that shows a schematic configuration of a television receiver according to Embodiment 1 of the present invention.

FIG. 1 is an exploded perspective view showing a schematic configuration of the television receiver TV according to Embodiment 1 of the present invention. As shown in FIG. 1, the television receiver TV of the present embodiment mainly includes a liquid crystal display device (a display device) 10, front and back cabinet Ca and Cb that sandwich the liquid crystal display device 10 to house it therebetween, a power source P, a tuner T, and a stand S. The liquid crystal display device 10 is supported by the stand S such that the display surface is along the vertical direction (Y axis direction).

Figure 2:
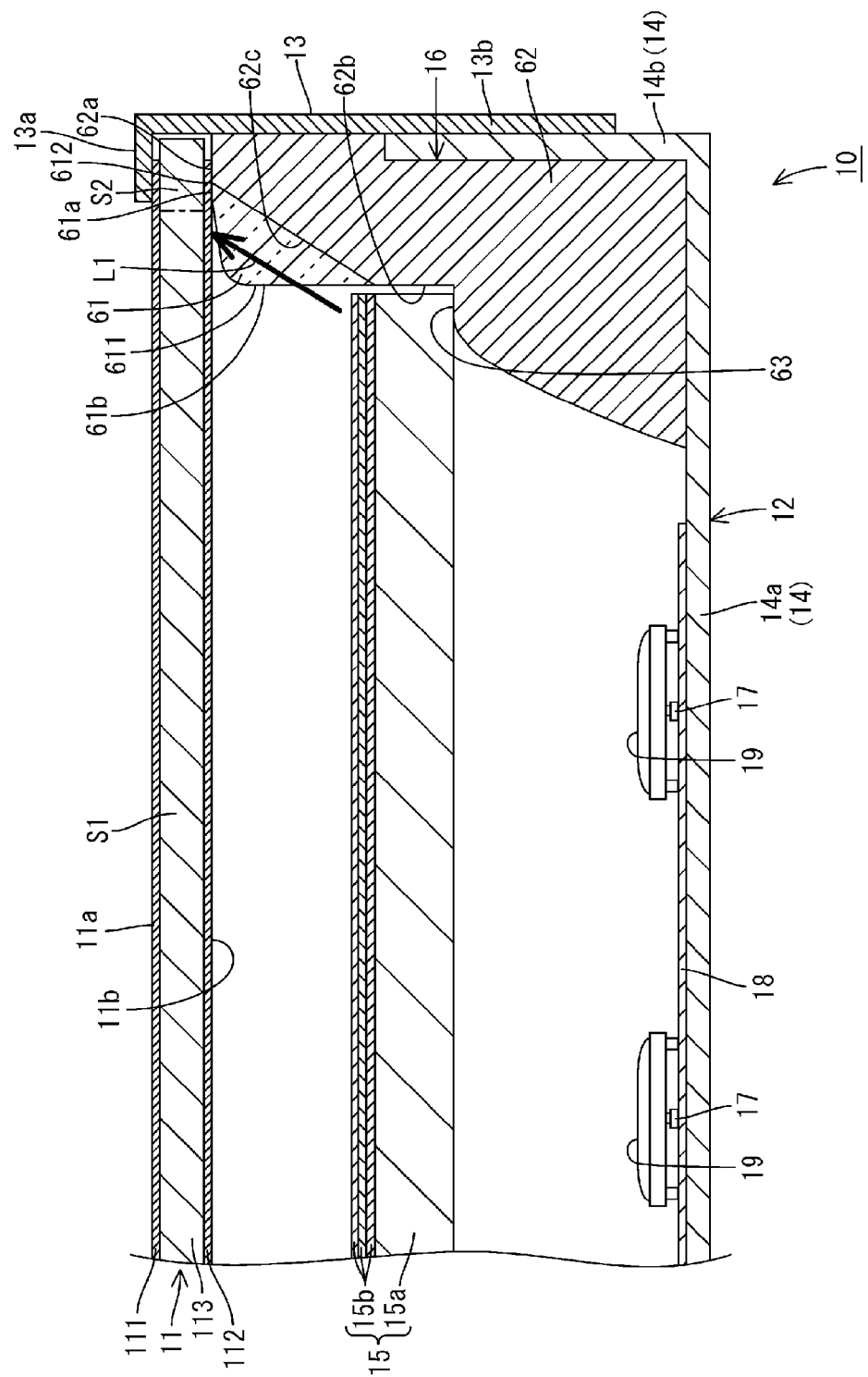
FIG. 2 is a cross-sectional view of FIG. 1 along the line A-A.

FIG. 2 is a cross-sectional view of FIG. 1 along the line A-A', and shows a cross-sectional configuration of the liquid crystal display device 10 of Embodiment 1. The liquid crystal display device 10 overall has a horizontally elongated rectangular shape in a plan view as viewed from the front. The liquid crystal display device 10 includes a liquid crystal panel 11, an illumination device 12 disposed on a rear surface 11b of the liquid crystal panel 11, and a frame-shaped bezel 13 that covers the liquid crystal panel 11 from a front side 11a.

The liquid crystal panel 11 overall has a horizontally elongated rectangular shape in a plan view as viewed from the front. The liquid crystal panel 11 includes a pair of transparent glass substrates that face each other, and a liquid crystal layer sealed therebetween. Of these substrates, one of the glass substrates that is disposed on the rear surface side is a so-called thin film transistor (hereinafter, TFT) array substrate, and the other glass substrate disposed on the front side is a so-called color filter (hereinafter, CF) substrate.

The TFT array substrate mainly includes a plurality of TFTs that are switching elements on a transparent glass plate, and a plurality of transparent pixel electrodes electrically connected to the drain electrodes of the respective TFTs and arranged in a matrix. The individual TFTs and pixel electrodes are provided for the respective pixels, each of which is delineated by a plurality of gate wiring lines and a plurality of source wiring lines provided on the glass plate so as to intersect each other. The gate electrodes of the respective TFTs are connected to the gate wiring lines, and the source electrodes of the respective TFTs are connected to the source wiring lines.

The CF substrate is mainly configured such that CFs of respective colors such as red (R), green (G), and blue (B) are arranged in a matrix on a transparent glass plate so as to correspond to the respective pixels on the TFT array substrate. The respective CFs are delineated by a light-shielding black matrix (BM) provided in a grid pattern on the glass plate. A transparent opposite electrode or the like is provided on the CFs and the BM so as to face the pixel electrodes on the TFT array substrate.

The liquid crystal panel 11 is configured such that image data and various control signals necessary to display images are supplied from a driver circuit substrate to the above-mentioned source wiring lines, gate wiring lines, opposite electrode, and the like, and the liquid crystal panel 11 is driven by the so-called active matrix method. The front and rear surfaces of the liquid crystal panel 11 are respectively provided with polarizing plates 111 and 112. The polarizing plates 111 and 112 are provided so as to sandwich a main portion 113 constituted of the pair of glass substrates.

The liquid crystal panel 11 includes a rectangular display region S1 where images are displayed, and a frame-shaped non-display region S2 that surrounds the periphery of the display region S1.

Next, the illumination device 12 will be explained. As shown in FIG. 2, the illumination device 12 mainly includes a chassis 14, optical members 15, a frame 16, LEDs (light sources) 17, LED substrates 18, and diffusion lenses 19. Light emitted from the illumination device 12 of the present embodiment to the rear surface of the liquid crystal panel 11 becomes a planar light with substantially even brightness.

The chassis 14 is a tray-shaped box with the upper side open, and is formed by press-treating or the like a plate material made of a metal such as an aluminum-type material. The chassis 14 includes a bottom plate 14a that has a horizontally elongated rectangular shape when viewed from the front in a plan view, and side walls 14b that rise from the periphery of the bottom plate 14a.

The frame 16 is a frame-shaped member used to fix in place the liquid crystal panel 11 and the optical members 15. The frame 16 is housed in the chassis 14 such that the upper edge protrudes further upward than the side walls 14b. The lower edge of the frame 16 is housed inside the chassis 14 so as to be attached to the inner wall surfaces of the side walls 14b. A portion of the upper edge of the frame 16 is on the upper edges of the side walls 14b. Edges of the liquid crystal panel 11 are on the upper edges of the frame 16. Edges of the optical members 15 are on the inner portion of the frame 16. Details of the frame 16 will be described later.

The optical members 15 have a horizontally elongated rectangular shape in a plan view, similar to the liquid crystal panel 11 and the like. The periphery of the optical members 15 is supported by the frame-shaped inner portion of the frame 16. The optical members 15 are disposed between the LEDs 17 and the liquid crystal panel 11 in the chassis 14.

The optical members 15 include a diffusion plate 15a disposed towards the rear (bottom), and optical sheets 15b disposed towards the front (towards the liquid crystal panel 11). The diffusion plate 15a is formed by dispersing a large number of diffusion particles in a substantially transparent resin base member having a prescribed thickness. This diffusion plate 15a has the function of dispersing light that is transmitted therethrough. The optical sheets 15b include sheet members thinner than the diffusion plate 15a. The optical sheets 15b of the present embodiment include three layers. The respective layers of the optical sheets 15b include a diffusion sheet layer, a lens sheet layer, a reflective polarizing sheet layer, or the like.

Next, the LED substrates 18 on which the LED 17 and the LED 17 are mounted will be described. The LEDs (light emitting diodes) 17 have a configuration in which an LED chip is sealed by a resin on a substrate portion fixed on the LED substrates 18. The LED chip has one primary wavelength, specifically emitting only blue. The resin material sealing the LED chip, on the other hand, has a phosphor dispersed therein that converts blue light emitted by the LED chip to white light. As a result, the LEDs 17 can emit white light. The LEDs 17 are of a so-called top type, and the surface thereof opposite to the mounting surface onto the LED substrate 18 is the light-emitting surface. The light from the LEDs 17 is emitted towards the rear surface of the liquid crystal panel 11.

The LED substrates 18 have an elongated shape (belt shape) and are fixed on the bottom plate 14a of the chassis 14. A plurality of the above-mentioned LEDs 17 are provided on each LED substrate 18. The LEDs 17 are respectively mounted on the surface of the LED substrate 18 in a row with equal gaps therebetween. A plurality of the LED substrates 18 are fixed so as to be aligned on the bottom plate 14a of the chassis 14. The respective LED substrates 18 are arranged such that the lengthwise direction thereof corresponds to the long side direction of the bottom plate 14a.

The LED substrates 18 mainly include a plate shaped base member made of a metal such as an aluminum type material, an insulating layer formed on the base member and made of a synthetic resin, wiring patterns that are made of a metal film such as copper foil on the insulating layer and that are electrically connected to the LEDs 17, and a reflective layer (solder resist layer) made of a white insulating film formed on the insulating layer so as to cover the wiring patterns. The LED substrates 18 are provided with connectors. The LED substrates 18 are electrically connected to an external LED control circuit through this connectors. The respective LEDs 17 mounted on the respective LED substrates 18 are dispersed in a plan view over the bottom plate 14a of the chassis 14.

The diffusion lenses 19 are made of a synthetic resin that is substantially transparent while having a higher index of refraction than air. Polycarbonate and acrylic are examples of this synthetic resin. The diffusion lenses 19 have a substantially circular shape in a plan view from the front, and are attached onto the LED substrate 18 so as to cover the LEDs 17. One diffusion lens 19 is provided per LED 17. The diffusion lens 19 is fixed onto the LED substrate 18 by an adhesive such that the center of the diffusion lens 19 matches the center of the LED 17. The diffusion lens 19 is used to diffuse light emitted by the LED 17. The light emitted by the LED 17 has a high (strong) directivity, and thus, light emitted by the LEDs 17 is made to have a low (weak) directivity by passing this light through the diffusion lens 19.

The frame 16 will be described here in detail. The frame 16 is a frame-shaped member used to fix in place the liquid crystal panel 11 and the optical members 15 as described above. The frame 16 is made of a transmissive frame portion 61 through which light can pass, and a non-transmissive frame portion 62 that extends along the transmissive frame portion 61 and that does not allow light to pass therethrough.

The transmissive frame portion 61 is made of an inner edge portion at the upper end of the frame 16, and has a frame shape along the periphery of the display region S1 of the liquid crystal panel 11. The transmissive frame portion 61 is made of a transparent resin (polycarbonate or acrylic, for example) that allows light to pass therethrough. Edges of the liquid crystal panel 11 are on the transmissive frame portion 61. In this case, the transmissive frame portion 61 is provided on the rear surface edges of the liquid crystal panel 11. An inner edge 611 of the transmissive frame portion 61 is in a position corresponding to the display region S1 when the edges of the liquid crystal panel 11 are placed thereon.

As shown in FIG. 2, the cross-sectional shape of the transmissive frame portion 61 is substantially triangular, and the transmissive frame portion 61 includes a substantially flat upper edge face, and an inner wall that extends downward from the inner edge of the upper edge face, substantially perpendicular thereto. The upper edge face of the transmissive frame portion 61 is a light-exiting surface (hereinafter, the light-emitting upper edge face) 61a from which light is emitted towards the edge of the liquid crystal panel 11. The inner wall of the transmissive frame portion 61 is a light-receiving face (hereinafter, the light-receiving inner wall) 61b where light from the LEDs 17 enters. Between the light-exiting upper edge face 61a and the light-receiving inner wall 61b, an inclined adhesive face that is inclined from the inner side towards the outer side of the frame 16 and that is attached to the non-transmissive frame portion 62 is arranged. When viewed from the front, the light-exiting upper end face 61a has a frame shape along the edges of the display region S1. The light-receiving inner wall 61b has a flat cylindrical shape surrounding the optical members 15 and LEDs 17.

The light emitted by the LEDs 17 enters the transmissive frame portion 61 from the light-receiving inner wall 61b, passes therethrough, and exits from the light-exiting upper edge face 61a towards the edges of the liquid crystal panel 11.

As shown in FIG. 2, the inner edge 611 of the light-exiting upper edge face 61a is in a position corresponding to the display region S1 of the liquid crystal panel 11. On the other hand, an outer edge 612 of the light-exiting upper edge face 61a is in a position corresponding to the non-display region S2 outside the display region S1. In other words, the outer edge 612 of the light-exiting upper edge face 61a of the transmissive frame portion 61 is to the outside of the boundary between the display region S1 and non-display region S2. The light emitted from the light-exiting upper edge face 61a mainly moves towards the edge of the liquid crystal panel 11 facing the light-exiting upper edge face 61a. In other words, the light emitted from the light-exiting upper edge face 61a illuminates the edge (outer edge) of the display region S1 from the rear. Among the light emitted from the light-exiting upper edge face 61a, some of the light first enters the non-display region S2 adjacent to the display region S1. This light moves diagonally from the non-display region S2 towards the display region S1.

The range of the light-exiting upper edge face 61a is set such that at least the outer edge thereof is further outside than the boundary between the display region S1 and non-display region S2. If the range of the light-exiting upper edge face 61a is set in this manner, the light from the LEDs 17 passes through the transmissive frame portion 61 and is reliably supplied to the periphery of the display region S1.

The non-transmissive frame portion 62 is the portion of the frame 16 that is not the above-mentioned transmissive frame portion 61. The upper edge portion of the non-transmissive frame portion 62 is provided so as to surround the outer edges 612 of the transmissive frame portion 61. The upper edge face 62a of the non-transmissive frame portion 62 is positioned outside of the light-exiting upper edge face 61a. In the present embodiment, the upper edge face of the frame 16 is constituted of the light-exiting upper edge face 61a of the transmissive frame portion 61 and the upper edge face 62a of the non-transmissive frame portion 62. If the edge of the liquid crystal panel 11 rests (is disposed) on the upper edge face of the frame 16, the non-display region S2 rests (is disposed) on the upper edge face 62a of the non-transmissive frame portion 62.

The portion on the lower edge of the non-transmissive frame portion 62 extends below the transmissive frame portion 61. The lower edge of the light-receiving inner wall 61b included in the transmissive frame portion 61 has extending therebelow an inner wall 62b of the non-transmissive frame portion 62. A mounting portion 63 on which the periphery of the optical members 15 rests is formed in the inner wall 62b of the non-transmissive frame portion 62. The mounting portion 63 is formed by processing the inner wall 62b of the non-transmissive frame portion 62 so as to form a step shape. The mounting portion 63 has a frame-shape when viewed from the front. The frame-shaped mounting portion 63 is disposed further inside than the upper edge face of the frame 16.

The position of the transmissive frame portion 61 is set such that the light-receiving inner wall 61b is further up than the optical members 15 resting on the mounting portion 63. When the position of the transmissive frame portion 61 is set in this manner, light emitted by the LEDs 17 can enter the transmissive frame portion 61 from the light-receiving inner wall 61b after passing through the optical members 15.

A plurality of transparent protrusions (not shown) to press the optical members 15 from the front are provided in the frame 16. The optical members 15 are attached to the frame 16 by being sandwiched between such protrusions and the mounting portion 63.

The lower edge of the non-transmissive frame portion 62 rests on the bottom plate 14a of the chassis 14. A small gap may be provided between the lower edge of the non-transmissive frame portion 62 and the bottom plate 14a of the chassis 14, taking into account thermal expansion and the like of the frame 16.

In the present embodiment, the non-transmissive frame portion 62 is made of a white synthetic resin that reflects light. Such a synthetic resin is made of a polycarbonate with white dye mixed in or the like, for example. The frame 16 constituted of the transmissive frame portion 61 and non-transmissive frame portion 62 is made to have two colors, for example. Also, the transmissive frame portion 61 and the non-transmissive frame portion 62 may be manufactured separately and then attached together by an adhesive to form the frame 16. In other embodiments, the non-transmissive frame portion 62 may be made of a light-shielding synthetic resin.

The non-transmissive frame portion 62 has an incline in the portion thereof in contact (connected portion) with the transmissive frame portion 61. This inclined portion is the light-reflecting surface 62c that reflects light, which has entered the transmissive frame portion 61 from the light-receiving inner wall 61b, upwards. If light that has entered from the light-receiving inner wall 61b hits the light-reflecting surface 62c, this light is gathered towards the light-exiting upper edge face 61a. Thus, when the light-reflecting surface 62c is provided in the frame 16, the light that enters the transmissive frame portion 61 from the light-receiving inner wall 61b exits efficiently from the light-exiting upper edge face 61a.

The frame 16 is attached to the chassis 14 by having the non-transmissive frame portion 62 be screwed onto the side wall 14b. The edge of the liquid crystal panel 11 rests on the upper surface (61a, 62a) of the frame 16 attached to the chassis 14 in this manner. The above-mentioned frame-shaped bezel 13 covers this liquid crystal panel 11 from the front. The bezel 13 is made by forming a metal such as an aluminum type material into a frame shape. The bezel 13 has an eve 13a that covers the edge of the liquid crystal panel 11 from the front, and a peripheral wall 13b that extends therebelow from the eve 13a.

As shown in FIG. 2, the eve 13a of the bezel 13 is a portion that covers only the non-display region 62 of the edges of the liquid crystal panel 11. This eve 13a has a frame-shape that covers the non-display region S2 when viewed from the front. The peripheral wall 13b is a portion that covers the outer peripheral surface of the frame 16 that protrudes from above the chassis 14, and covers the outer wall face of the side wall 14b of the chassis 14. The bezel 13 is fixed to the illumination device 12 by having the peripheral wall 13b be screwed onto the chassis 14 and the like. The liquid crystal panel 11 is fixed to the illumination device 12 by having the edge of the liquid crystal panel 11 be sandwiched between the eve 13a of the bezel 13 and the upper edge face (61a, 62a) of the frame 16.

In such a liquid crystal display device 10, as described above, the liquid crystal panel 11 is supported by the frame 16 (transmissive frame portion 61) having an inner edge within the display region S1. In other words, in the liquid crystal panel 11, both the non-display region S2 and the edge (outer edge) of the display region S1 therein are supported by (disposed on) the frame 16 (transmissive frame portion 61). Thus, in the liquid crystal display device 10 of the present embodiment, positional shift of the liquid crystal panel 11 within the opening of the frame 16 caused by the liquid crystal panel 11 falling out of place from the upper edge face of the frame 16 is mitigated even if there is variation in the dimensions of the frame 16 or even if the shape of the frame 16 changes slightly due to thermal expansion or the like, because the portion of the liquid crystal panel 11 supported by the frame 16 is within the display region S1.

In the liquid crystal display device 10 of the present embodiment, there are no display anomalies in the display region S1 even if the frame 16 (transmissive frame portion 61) has the inner edge 611 thereof within the display region S1. The reason for that will be explained below.

The liquid crystal display device 10 is illuminated by LEDs 17 provided in the illumination device 12 when an image is displayed in a front surface 11a of the display region S1. The respective LEDs 17 are disposed within the lower edge side of the frame 16, and thus, when the LEDs 17 emit light, this light travels upward within the frame 16 (portion surrounded by the inner wall (61b, 62b)).

Specifically, the light emitted by the LEDs 17 through the diffusion lenses 19 travels within the frame 16 and passes through the optical members 15. Most of the light passing through the optical members 15 travels as is within the frame 16 and illuminates the rear surface of the display region S1 of the liquid crystal panel 11. By contrast, the remainder of the light passing through the optical members 15 (reference character L1 in FIG. 2 is this light) passes through the transmissive frame portion 61 and illuminates the edges of the display region S1 of the liquid crystal panel 11. In other words, in the liquid crystal display device 10 of the present embodiment, light emitted by the LEDs 17 can reach the edges of the display region S1 of the liquid crystal panel 11. The transmissive frame portion 61 does not block light even if it is within the display region S1, and thus, light from the LEDs 17 can be guided to the periphery (edge) of the display region S1.

Figure 3:
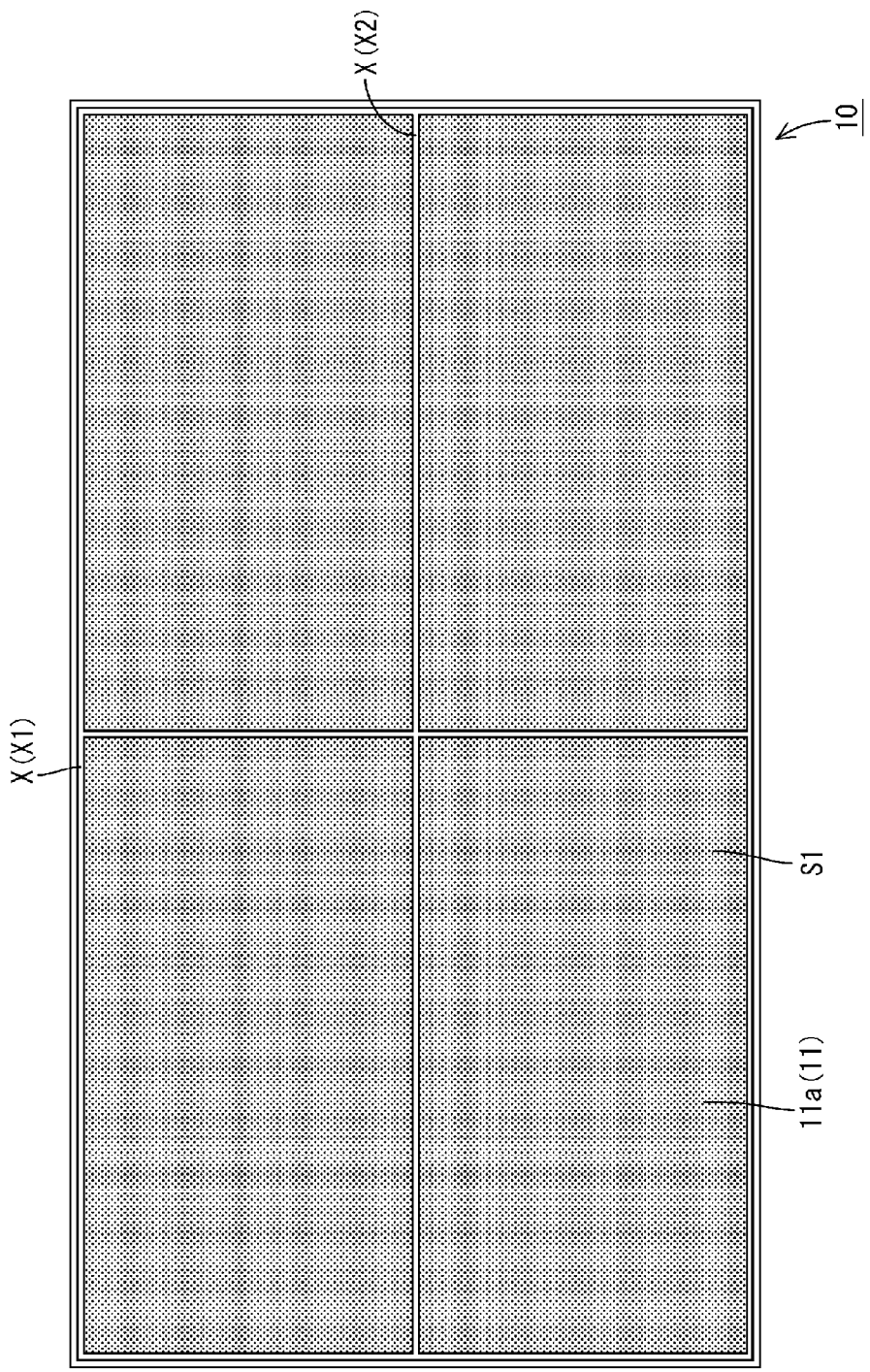
FIG. 3 is a plan view of a liquid crystal display device of Embodiment 1 in which a test image is displayed.

FIG. 3 is a plan view of the liquid crystal display device 10 of Embodiment 1 where a test image X is displayed. The presence or absence of display anomalies was determined by displaying the test image X in the liquid crystal display device 10 of the present embodiment. The test image X includes a frame-shaped white image X1, a cross-shaped white image X2, and a black image in the remainder thereof. The width of the test image X1 is set so as to be substantially the same as the width of the portion of the frame 16 (transmissive frame portion 61) within the display region S1. In the liquid crystal display device 10 of the present embodiment, light from the LEDs 17 reaches the edge (periphery) of the display region S1, and thus, the frame-shaped test image X1 shown in FIG. 3 can be displayed in the front surface 11a of the liquid crystal panel 11.

In the case of the liquid crystal display device 10 of the present embodiment, the brightness (amount) of light illuminating the edge (edge of the display region S1) of the liquid crystal panel 11 after passing through the transmissive frame portion 61 can be effectively increased by the light-reflecting surface 62c included in the non-transmissive frame portion 62. The light-reflecting surface 62c faces the above-mentioned inclined adhesive surface of the transmissive frame portion 61. Light entering the transmissive frame portion 61 is reflected by the light-reflecting surface 62c and travels towards the periphery (edge) of the display region S1 of the liquid crystal panel 11. This causes the display region S1 of the liquid crystal panel 11 to be illuminated not only by light traveling vertically upward from directly below, but also light radiated diagonally from outside the display region S1 towards the inside thereof.

In generally, the periphery (edge) of the display region S1 has a tendency to have a lower brightness than the central portion thereof. A difference in brightness between the central portion of the display region S1 and the edges (periphery) thereof may be mitigated by using the light-reflecting surface 62c as in the present embodiment. In the present embodiment, a difference in brightness between the frame-shaped test image X1 displayed in the periphery of the display region S1 and the cross-shaped test image X2 displayed towards the center thereof is mitigated.

Also, in the case of the liquid crystal display device 10 of the present embodiment, leakage of light that has passed through the transmissive frame portion 61 towards the front surface 11a by passing between the outer periphery of the liquid crystal panel 11 and the bezel 13 is also mitigated. In the present embodiment, the inner edge of the non-display region S2 of the liquid crystal panel 11 faces the light-exiting upper edge face 61a but the outer edge faces the upper edge face 62a of the non-transmissive frame portion 62 that does not emit light. Thus, the light passing through the transmissive frame portion 61 is prevented from entering the outer edge of the liquid crystal panel 11. Thus, in the liquid crystal display device 10 of the present embodiment, even if the transmissive frame portion 61 is provided, leakage of unwanted light towards the front from a gap between the eve 13a of the bezel 13 and the liquid crystal panel 11 is mitigated.

Embodiment 2

Figure 4:
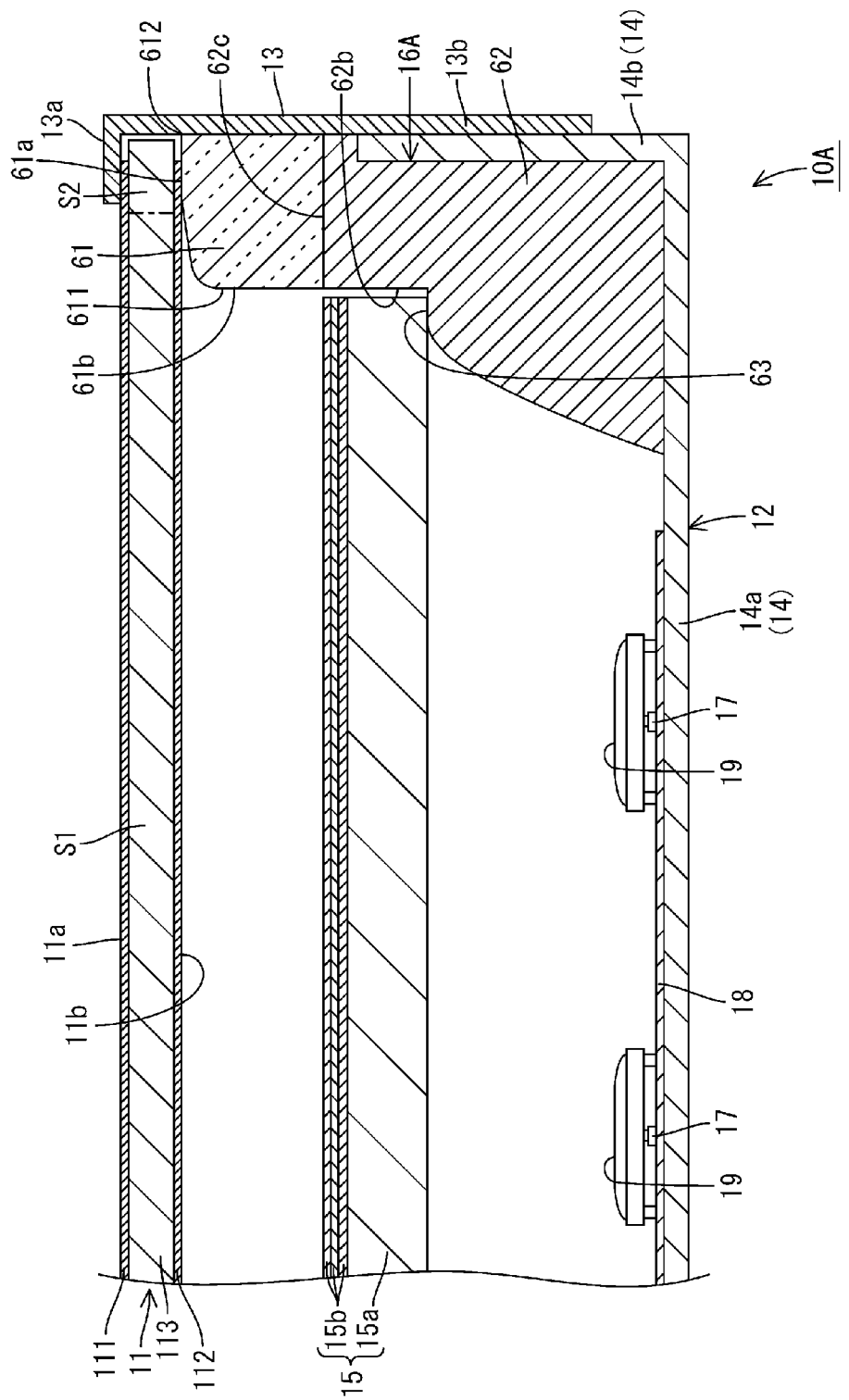
FIG. 4 is a partial cross-sectional view of a schematic configuration of a liquid crystal display device according to Embodiment 2.

Next, Embodiment 2 of the present invention will be explained below with reference to FIG. 4. In the respective embodiments below, parts that are the same as those in Embodiment 1 will be assigned the same reference characters as Embodiment 1, and detailed descriptions thereof will be omitted. In the present embodiment, a liquid crystal display device 10A will be described as an example.

The basic configuration of the liquid crystal display device 10A of the present embodiment is similar to that of Embodiment 1. However, the configuration of a frame 16A in an illumination device 12 in the liquid crystal display device 10A of the present embodiment differs from that of Embodiment 1. Below, the frame 16A of the present embodiment will be mainly described.

The outer shape of the frame 16A is similar to that of Embodiment 1, but the shapes of the transmissive frame portion 61 and non-transmissive frame portion 62 included in the frame 16A respectively differ from those of Embodiment 1. The transmissive frame portion 61 included in the frame 16A is made up of the upper edge side of the frame 16A and the non-transmissive frame portion 62 is made up of the lower edge side of the frame 16A. In other words, the frame 16A has a two-layer up-and-down structure including the transmissive frame portion 61 and the non-transmissive frame portion 62.

The upper edge face 61a of the transmissive frame portion 61 (that is, the upper edge face of the frame 16A) is similar to that of Embodiment 1 in that the upper edge face is a light-exiting upper edge face 61a, but the width (area) thereof is set to be larger. The edges of the liquid crystal panel 11 rest on the light-exiting upper edge face 61a of the transmissive frame portion 61. Light entering the transmissive frame portion 61 from a light-receiving edge face 61b is emitted from the light-exiting upper edge face 61 towards the edge face of the liquid crystal panel 11 on the rear surface 11b. In the present embodiment, the light-reflecting surface 62c of the non-transmissive frame portion 62 is disposed so as to be parallel to the front surface of the optical members 15. That is, the contact portion between the transmissive frame portion 61 and the non-transmissive frame portion 62 is set at the same position as the front surface of the optical members 15. The light-reflecting surface 62c included in the non-transmissive frame portion 62 of the present embodiment can also efficiently guide light passing through the transmissive frame portion 61 to the light-exiting upper edge face 61a to a certain extent.

Even with the liquid crystal display device 10A including such a frame 16A, display anomalies in the edge (periphery) of the display region S1 are mitigated with the frame 16A (transmissive frame portion 61) being in a position corresponding to the display region S1, as in Embodiment 1.

Embodiment 3

Figure 5:
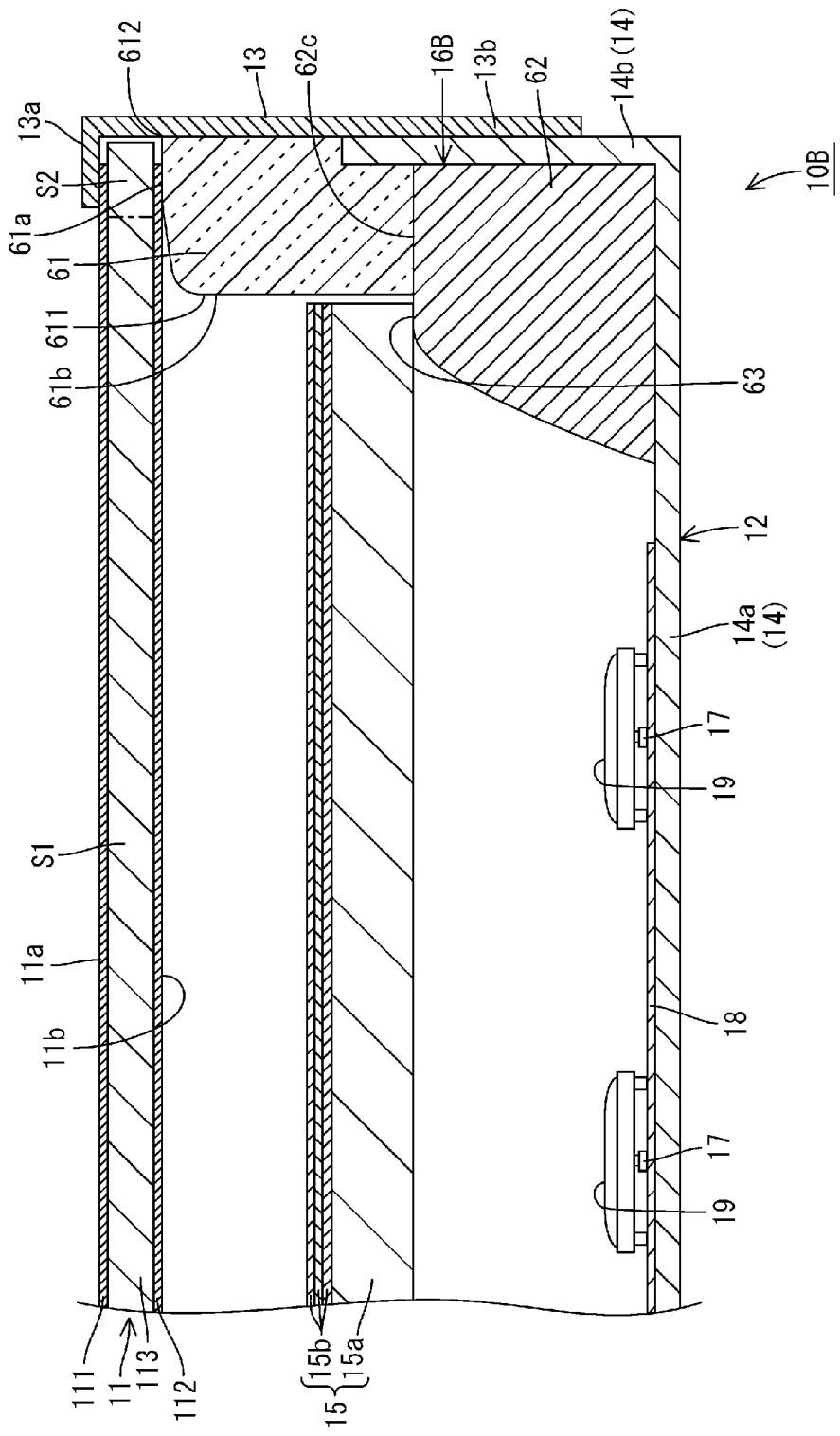
FIG. 5 is a partial cross-sectional view of a schematic configuration of a liquid crystal display device according to Embodiment 3.

Next, Embodiment 3 of the present invention will be explained below with reference to FIG. 5. In the present embodiment, a liquid crystal display device 10B will be described as an example.

The basic configuration of the liquid crystal display device 10B of the present embodiment is similar to those of Embodiments 1 and 2. However, the configuration of a frame 16B in an illumination device 12 in the liquid crystal display device 10B of the present embodiment differs from those of Embodiments 1 and 2. Below, the frame 16B of the present embodiment will be mainly described.

The outer shape of the frame 16B is similar to those of Embodiments 1 and 2, but the shapes of the transmissive frame portion 61 and non-transmissive frame portion 62 included in the frame 16B respectively differ from those of Embodiments 1 and 2. The transmissive frame portion 61 included in the frame 16B is made up of the upper edge side of the frame 16B and the non-transmissive frame portion 62 is made up of the lower edge side of the frame 16B. In other words, the frame 16B has a two-layer up-and-down structure including the transmissive frame portion 61 and the non-transmissive frame portion 62, similar to Embodiment 2. However, in the frame 16B of the present embodiment, the transmissive frame portion 61 takes up a larger proportion than that of Embodiment 2. In other words, in the frame 16B, the transmissive frame portion 61 is larger than that of Embodiment 2.

In the present embodiment, the contact portion between the transmissive frame portion 61 and the non-transmissive frame portion 62 is set at the same position as the rear surface of the optical members 15. That is, the light-reflecting surface 62c of the non-transmissive frame portion 62 is set at the same position as the rear surface of the optical members 15. Thus, the length of the transmissive frame portion 61 of the frame 16B (length in the up-and-down direction in FIG. 5) is greater than that of Embodiment 2, and the length of the light-receiving inner wall 61b is also greater than that of Embodiment 2.

The position of the boundary between the transmissive frame portion 61 and the non-transmissive frame portion 62 may be appropriately set, taking into consideration the amount of light and the like passing through the transmissive frame portion 61 and radiated onto the edge face of the liquid crystal panel 11.

Even with the liquid crystal display device 10B including such a frame 16B, display anomalies in the edge (periphery) of the display region S1 are mitigated with the frame 16B (transmissive frame portion 61) being in a position corresponding to the display region S1, as in Embodiment 1.

Embodiment 4

Figure 6:
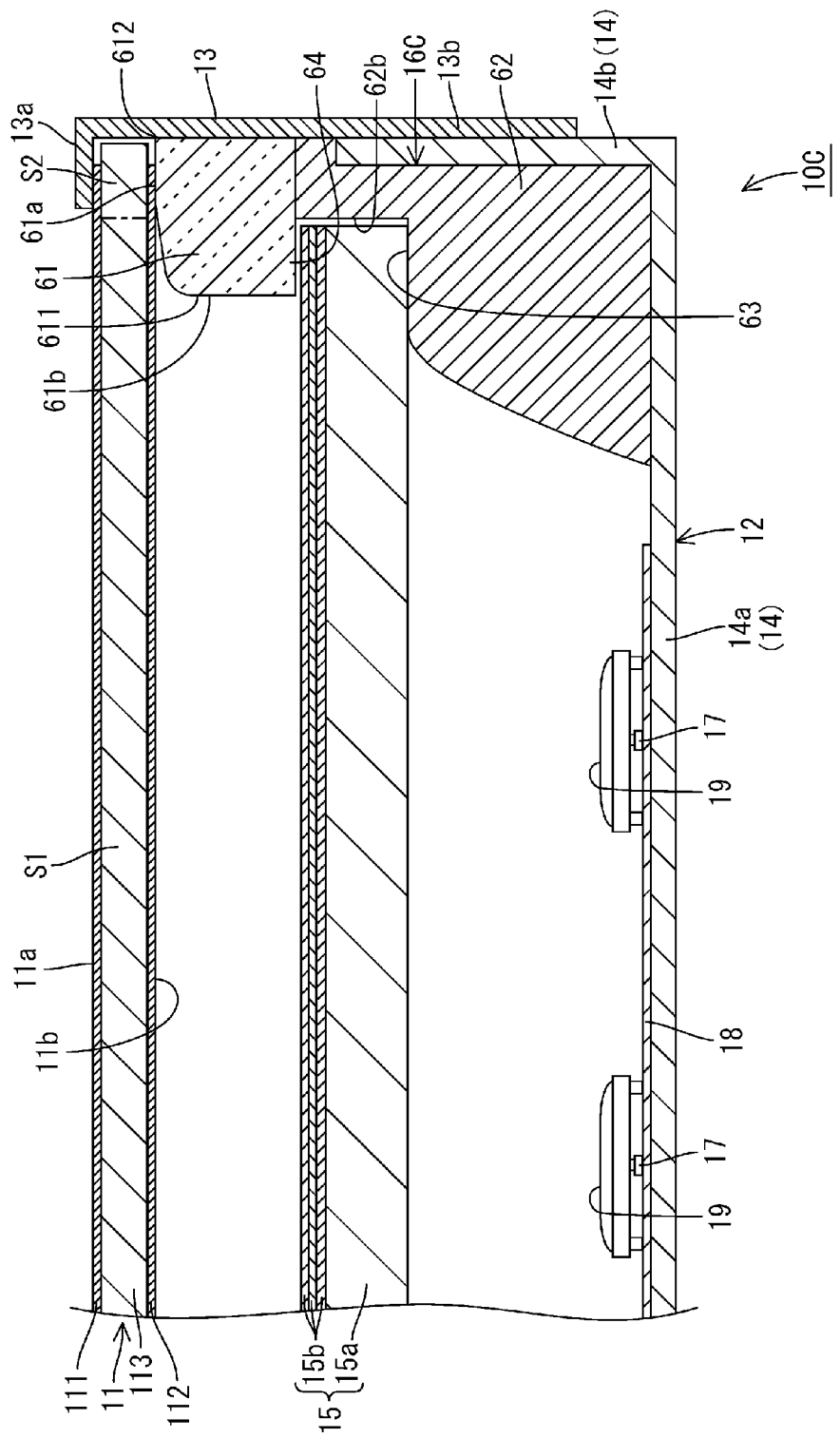
FIG. 6 is a partial cross-sectional view of a schematic configuration of a liquid crystal display device according to Embodiment 4.

Next, Embodiment 4 of the present invention will be explained below with reference to FIG. 6. In the present embodiment, a liquid crystal display device 10C will be described as an example. The basic configuration of the liquid crystal display device 10C of the present embodiment is similar to that of Embodiment 2. However, the configuration of the frame 16C included in the illumination device 12 of the liquid crystal display device 10C of the present embodiment differs from that of Embodiment 2. Below, the frame 16C of the present embodiment will be mainly described.

The frame 16C has the configuration of the frame 16A of Embodiment 2, but the upper edge (boundary portion with the transparent frame portion 61) of the non-transparent frame portion 62 has a shape that is caved in towards the outer side. The transmissive frame portion 61 of the frame 16C has a substantially similar shape to that of Embodiment 2, but the inner edge protrudes further towards the inside than the wall 62b of the non-transmissive frame portion 62. Also, the width (area) of the mounting portion 63 of the non-transmissive frame portion 62 on which the periphery of the optical members 15 rests is greater than that of Embodiment 2. In the frame 16C, the edge of the optical members 15 can be fixed in place between the portion of the transmissive frame portion 61 protruding inward and the mounting portion 63 of the non-transmissive frame portion 62. The optical members 15 used in the present embodiment are fixed by having the edge thereof inserted in the frame 16C, and the size thereof is set to be slightly greater than that of Embodiment 2 and the like.

In this manner, the optical members 15 may be positioned in the chassis 14 using the frame 16C. Even with the liquid crystal display device 10C including such a frame 16C, it is possible to mitigate display anomalies in the edge (periphery) of the display region S1 with the frame 16C (transmissive frame portion 61) being in the display region S1, as in Embodiment 2.

Embodiment 5

Figure 7:
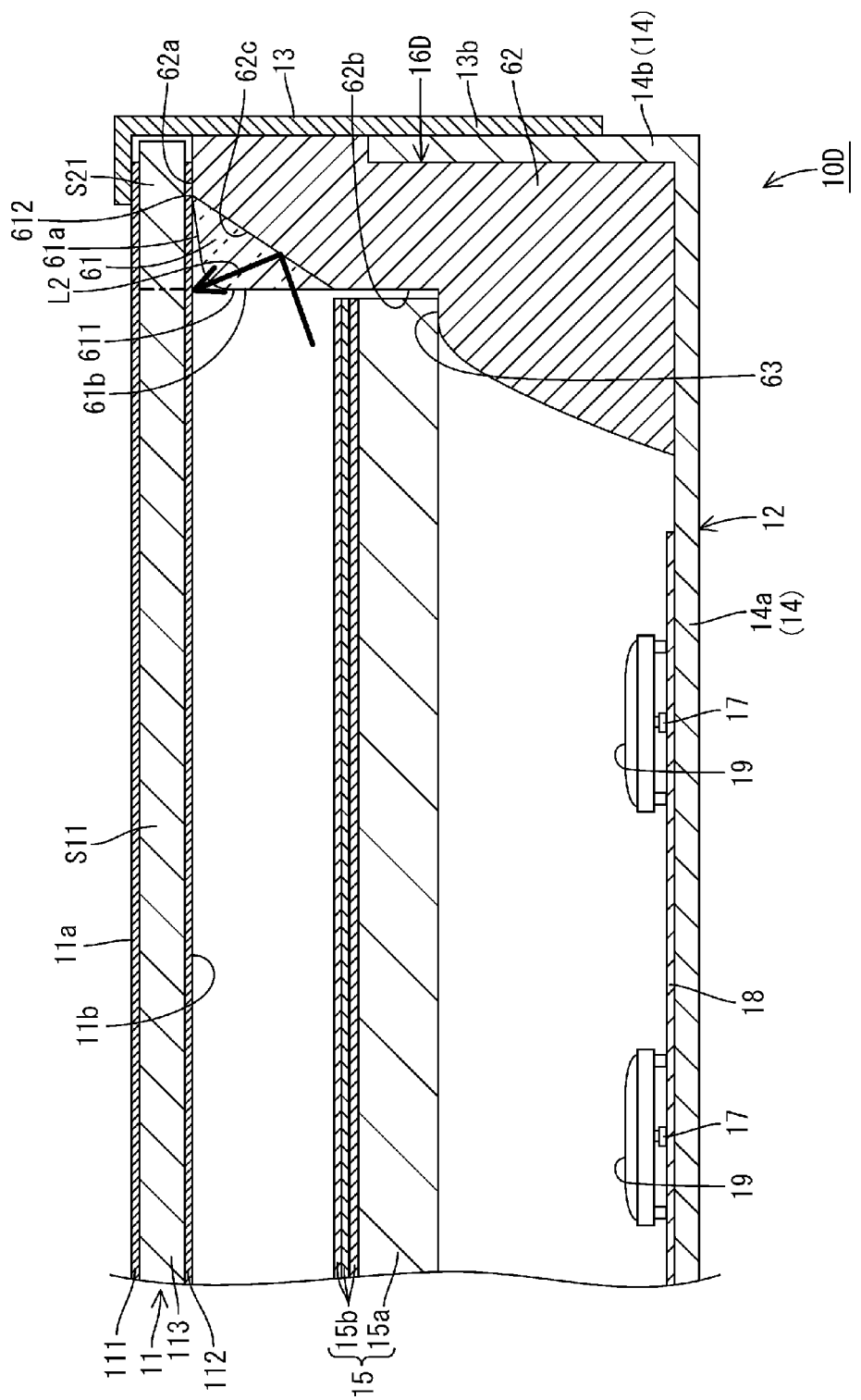
FIG. 7 is a partial cross-sectional view of a schematic configuration of a liquid crystal display device according to Embodiment 5.

Next, Embodiment 5 of the present invention will be explained below with reference to FIG. 7. In the present embodiment, a liquid crystal display device 10D will be described as an example. The basic configuration of the liquid crystal display device 10D of the present embodiment is similar to that of Embodiment 1. However, in the liquid crystal display device 10D of the present embodiment, a non-display region S21 of the liquid crystal panel 11 is set to be wider than that of Embodiment 1, and a display region S11 is set to have a smaller area than that of Embodiment 1. Thus, a portion of the frame 16D of the present embodiment where the edge of the liquid crystal panel 11 rests has a greater width than that of Embodiment 1. In the present embodiment, the inner edge 611 of the transmissive frame portion 61 included in the frame 16D is not in a position corresponding to the display region S11 of the liquid crystal panel 11, and is in a position corresponding to the non-display region S21.

Also, a light-exiting upper edge face 61a of the transmissive frame portion 61 faces the non-display region S21 of the liquid crystal panel 11. The non-transmissive frame portion 62 is disposed outside of the transmissive frame portion 61, and the upper edge face 62a of the non-transmissive frame portion 62 is covered by the rear surface of the liquid crystal panel 11 at the non-display region 21 thereof.

In the present embodiment, light emitted by the LEDs 17 travels towards the periphery of the display region S11 of the liquid crystal panel 11 after passing through the transmissive frame portion 61. In this case, light (refer to the reference character L2 in FIG. 7) traveling diagonally from the outside of the display region S11 towards the inside thereof moves towards the periphery of the display region S11. In the periphery of the display region S11, not only does light enter vertically upwards from directly below, light that travels diagonally as described above also enters. Thus, the liquid crystal display device 10D of the present embodiment mitigates display anomalies in the display region S11, not only when the display region S11 is viewed from the front perpendicularly in relation to the front surface 11a, but also when viewing the periphery of the display region S11 from the diagonal direction from the inner side towards the outer side. Below the transmissive frame portion 61, a light-reflecting surface 62c that is inclined from the inner side towards the outer side of the transmissive frame portion 61 is provided. Thus, light entering the transmissive frame portion 61 is reflected by the light-reflecting surface 62c, which allows it to reliably enter the periphery of the display region S11.

Comparison Example 1

Figure 8:
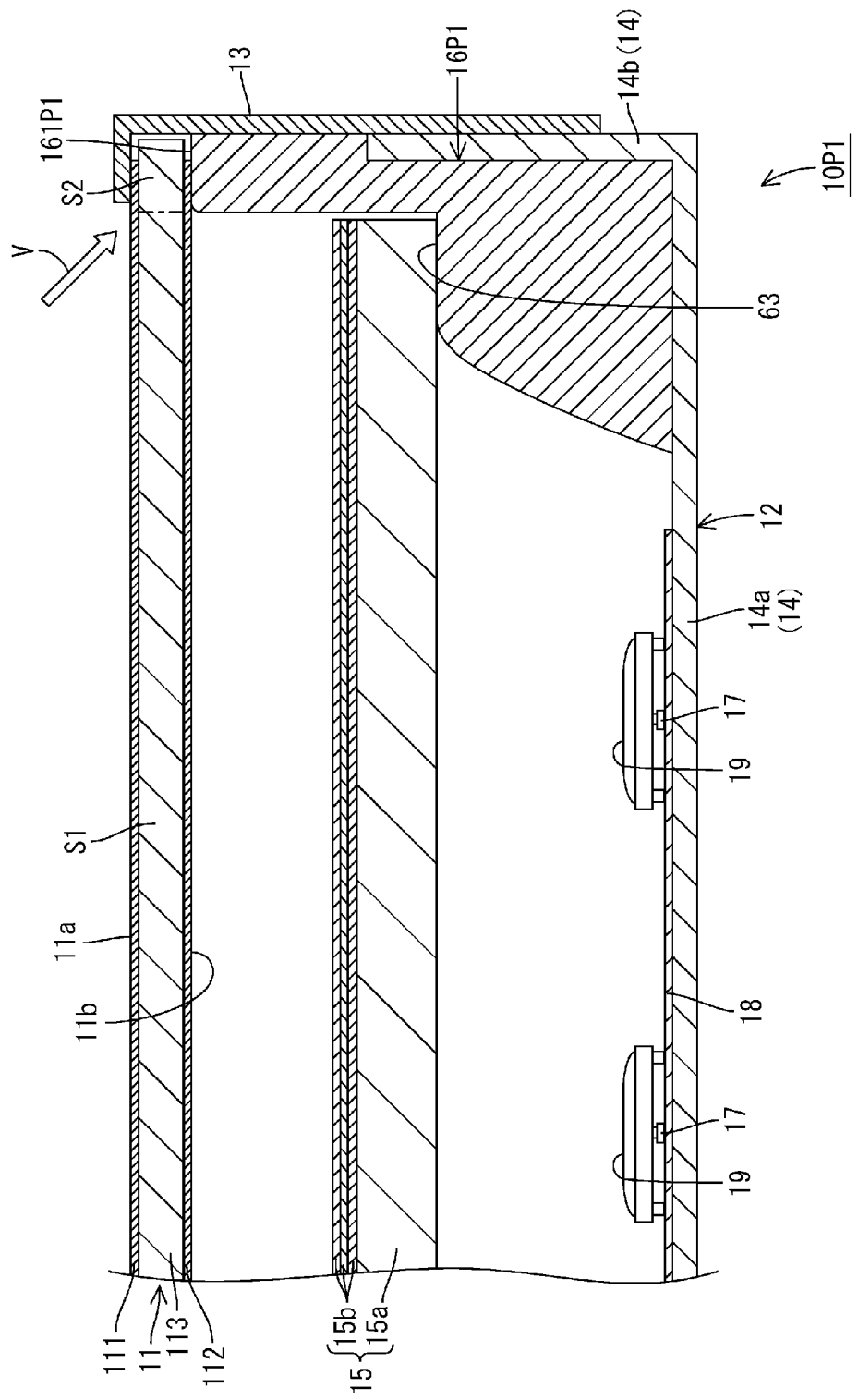
FIG. 8 is a partial cross-sectional view of a schematic configuration of a liquid crystal display device according to Comparison Example 1.

Next, Comparison Example 1 will be explained below with reference to FIG. 8. In Comparison Example 1, a liquid crystal display device 10P1 will be described as an example. The liquid crystal display device 10P1 has the same general configuration as the liquid crystal display device 10 of Embodiment 1. However, a frame 16P1 of the liquid crystal display device 10P1 differs completely in configuration from that of Embodiment 1. The frame 16P1 will be described below.

The frame 16P1 of Comparison Example 1 is only made of a member that does not allow light through, unlike that of Embodiment 1. Only a non-display region S2 of the liquid crystal panel 11 rests on the frame 16P1. In other words, the inner edge of the frame 16P1 is set so as not to be in a position corresponding to the display region S1. If such a frame 16P1 is used, then there is a risk that the liquid crystal panel 11 comes out of place falls from the frame 16P1 if the frame 16P1 changes shape due to thermal expansion, or the shape differs slightly due to variation in dimensions.

In the liquid crystal display device 10P1, when the periphery of the display region S1 is viewed from the front perpendicularly to the front surface 11a, display anomalies are not seen in the periphery of the display region S1, but when the periphery of the display region S1 is viewed diagonally from the center (see direction indicated by the arrow V in FIG. 8), display anomalies (missing pixels) appear in the periphery. Such display anomalies occur due to a lack of light passing in the diagonal direction from the rear surface 11b of the liquid crystal panel to the front surface 11a. In the liquid crystal display device 10P1, the inner edge of the frame 16P1 is not in a position corresponding to the display region S1, but is in the vicinity of the boundary between the display region S1 and the non-display region S2. Thus, the inner edge of the frame 16P1 blocks light from the LEDs 17, and depending on the viewing angle, display anomalies are seen in the display region S1.

Comparison Example 2

Figure 9:
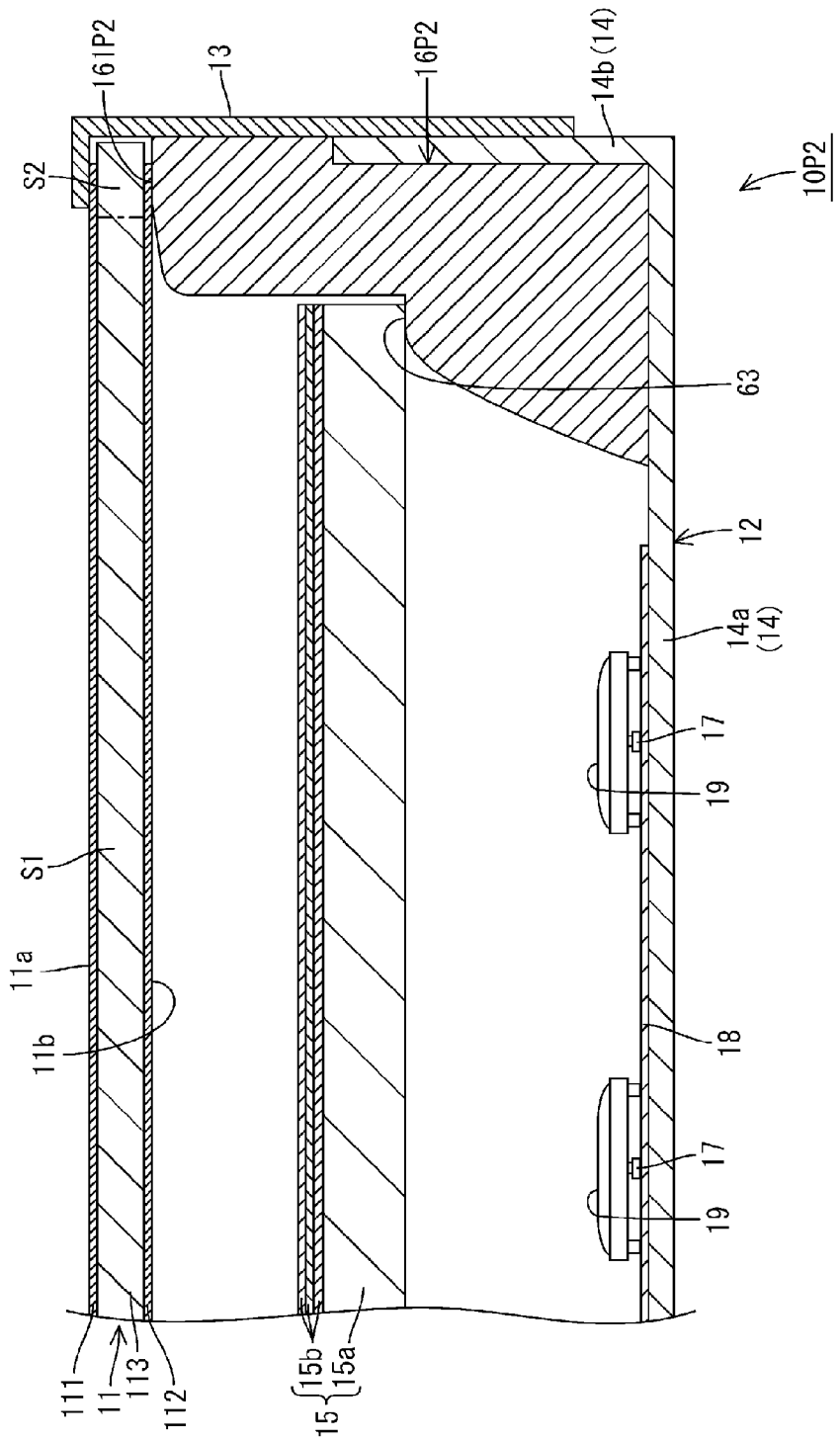
FIG. 9 is a partial cross-sectional view of a schematic configuration of a liquid crystal display device according to Comparison Example 2.

Next, Comparison Example 2 will be described with reference to FIGS. 9 and 10. In Comparison Example 2, a liquid crystal display device 10P2 will be described as an example. The liquid crystal display device 10P2 has the same general configuration as the liquid crystal display device 10 of Embodiment 1. However, a frame 16P2 of the liquid crystal display device 10P2 differs completely from that of Embodiment 1. The frame 16P2 will be described below.

The frame 16P2 of Comparison Example 2 is only made of a member that does not allow light through, unlike that of Embodiment 1. Also, unlike Comparison Example 1, the frame 16P2 is for mounting the edge of the display region S1 and the non-display region S2 of the liquid crystal panel 11. In other words, the inner edge of the frame 16P2 is set so as to be in a position corresponding to the display region S1. If using such a frame 16P2, light from the LEDs 17 does not reach the edge (outer periphery) of the display region S1.

Figure 10:
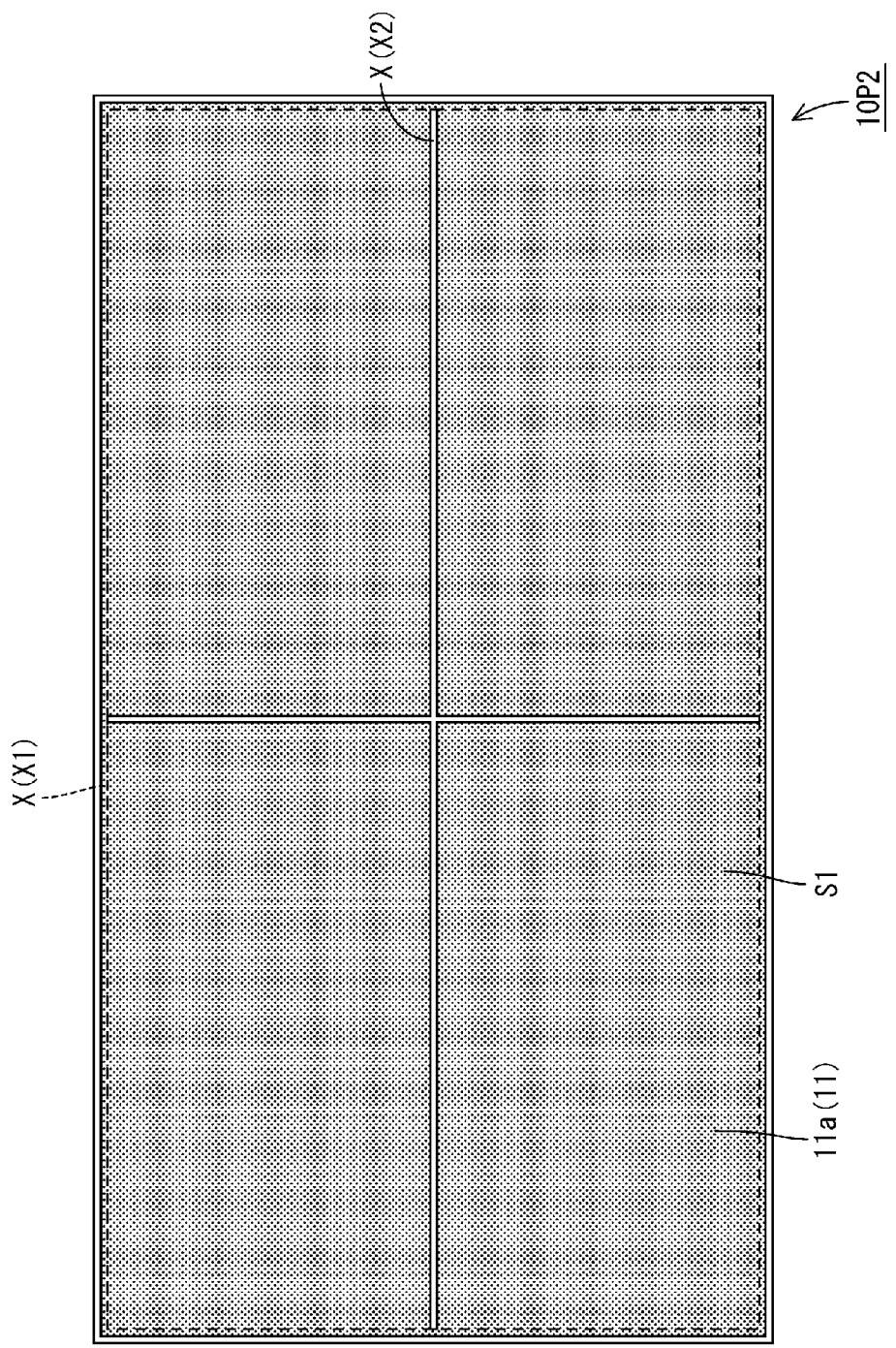
FIG. 10 is a plan view of a liquid crystal display device of Comparison Example 2 in which a test image is displayed.

FIG. 10 is a plan view of the liquid crystal display device 10P2 of Comparison Example 2 in which a test image X is displayed. An attempt was made to display the same test image X as Embodiment 1 in the liquid crystal display device 10P2. As shown in FIG. 10, while a cross-shaped test image X2 displayed in the central portion of the display region S1 can be seen, a frame shaped test image X1 that should be displayed in the edge (periphery) of the display region S1 cannot be seen. The inner edge of the frame 16P2 covers the edge (periphery) of the display region S1 and blocks light from the LEDs 17, and thus, display anomalies occur in the edge (periphery) of the display region S1 of the liquid crystal display device 10P2 of Comparison Example 2.

Other Embodiments

The present invention is not limited to the embodiments shown in the drawings and described above, and the following embodiments are also included in the technical scope of the present invention, for example.

(1) In Embodiment 1, a configuration including diffusion lenses 19 was described as an example, but other embodiments may have a configuration that does not include the diffusion lenses 19.

(2) In Embodiment 1, the frame 16 is constituted of the transmissive frame portion 61 and the non-transmissive frame portion 62, but in other embodiments, a frame 16 including only the transmissive frame portion 61 may be used, for example.

(3) In Embodiment 1, the upper edge face (light-exiting upper edge face) 61a of the transmissive frame portion 61 has a shallow inclined face at the inner edge, but in other embodiments, the upper edge face (light-exiting upper edge face) 61a may be flat.

(4) In Embodiment 1, LEDs 17 are used as the light source, but in other embodiments, a light source other than LEDs (a cold cathode fluorescent lamp, for example) may be used.

(5) In Embodiment 1, TFTs are used as the switching elements in the liquid crystal display device, but in other embodiments, the liquid crystal display device can use switching elements other than TFTs (thin film diodes, for example), and besides a color liquid crystal display device, a black and white liquid crystal display device can be used.

(6) In Embodiment 1, a television receiver that includes a tuner was described as an example, but in other embodiments the present invention can be applied to a display device without a tuner.

DESCRIPTION OF REFERENCE CHARACTERS 10, 10A, 10B, 10C liquid crystal display device (display device)
11 liquid crystal panel
12 illumination device
13 bezel
14 chassis
15 optical member
16, 16A, 16B, 16C frame
61 transmissive frame portion
62 non-transmissive frame portion
S1 display region
S2 non-display region

The invention claimed is:

1. A display device, comprising:
a liquid crystal panel having a display region and a frame-shaped non-display region surrounding a periphery of the display region;
a frame including a transmissive frame portion over which edges of a rear surface of the liquid crystal panel are disposed, and that allows light to pass therethrough; and
light sources that are disposed in an inner side of the transmissive frame portion, and that emit light towards the rear surface of the liquid crystal panel,
wherein the frame further includes a non-transmissive frame portion that extends along the transmissive frame portion integrally therewith, and that does not allow light to pass therethrough,
wherein a portion of the non-transmissive frame portion in contact with the transmissive frame portion is a light-reflecting surface, and
wherein the light-reflecting surface is inclined so as to rise from an inner edge towards an outer edge of the transmissive frame portion.

2. The display device according to claim 1, wherein the transmissive frame portion is disposed such that an outer edge thereof is in a position corresponding to the non-display region, and so as to be provided at an edge of the rear surface of the liquid crystal panel.

3. The display device according to claim 1, wherein the non-transmissive frame portion is provided so as to surround outer edges of the transmissive frame portion, in a position corresponding to the non-display region.

4. The display device according to claim 1, further comprising plate-shaped optical members that are disposed between the liquid crystal panel and the light sources, and that allows light radiated from the light sources to pass therethrough,
wherein the non-transmissive frame portion has a mounting portion upon which a periphery of the optical members is mounted.

5. The display device according to claim 4, wherein the transmissive frame portion sandwiches the periphery of the optical members with the mounting portion.

6. The display device according to claim 1, wherein the transmissive frame portion is provided on edges of the rear surface of the liquid crystal panel such that an inner edge of the transmissive frame portion is in a position corresponding to the display region.

7. The display device according to claim 1, wherein the transmissive frame portion is provided on edges of the rear surface of the liquid crystal panel such that an inner edge of the transmissive frame portion is in a position corresponding to the non-display region.

8. The display device according to claim 1, further comprising a frame-shaped bezel that covers a periphery of the liquid crystal panel so as to cover the non-display region of the liquid crystal panel from a front surface thereof.

9. A television receiver, comprising the display device according to claim 1.

* * * * *